US007761394B2

(12) United States Patent
Acharya et al.

(10) Patent No.: US 7,761,394 B2
(45) Date of Patent: Jul. 20, 2010

(54) AUGMENTED DATASET REPRESENTATION USING A TAXONOMY WHICH ACCOUNTS FOR SIMILARITY AND DISSIMILARITY BETWEEN EACH RECORD IN THE DATASET AND A USER'S SIMILARITY-BIASED INTUITION

(75) Inventors: Chiranjit Acharya, San Jose, CA (US); Khemdut Purang, San Jose, CA (US); Mark Plutowski, Santa Cruz, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 601 days.

(21) Appl. No.: 11/457,103

(22) Filed: Jul. 12, 2006
(Under 37 CFR 1.47)

(65) Prior Publication Data
US 2007/0271266 A1 Nov. 22, 2007

Related U.S. Application Data

(63) Continuation-in-part of application No. 11/436,142, filed on May 16, 2006.

(51) Int. Cl.
*G06F 17/00* (2006.01)
*G06F 19/00* (2006.01)
(52) U.S. Cl. ............................. 706/45; 706/46; 706/47
(58) Field of Classification Search ....................... None
See application file for complete search history.

(56) References Cited
U.S. PATENT DOCUMENTS

| 6,446,061 | B1 | 9/2002 | Doerre et al. |
| 6,460,036 | B1 | 10/2002 | Herz |
| 6,886,007 | B2 | 4/2005 | Leymann et al. |
| 2002/0042793 | A1* | 4/2002 | Choi ............................. 707/6 |
| 2003/0126561 | A1 | 7/2003 | Woehler et al. |
| 2003/0177000 | A1 | 9/2003 | Mao et al. |
| 2003/0217052 | A1* | 11/2003 | Rubenczyk et al. ............ 707/3 |
| 2004/0111438 | A1 | 6/2004 | Chitrapura et al. |
| 2005/0044487 | A1 | 2/2005 | Bellegarda et al. |
| 2006/0004747 | A1 | 1/2006 | Weare |
| 2006/0031217 | A1 | 2/2006 | Smith et al. |
| 2006/0095521 | A1* | 5/2006 | Patinkin ...................... 709/206 |

OTHER PUBLICATIONS

U.S. Appl. No. 11/436,142, filed May 16, 2006, Acharya et al.
U.S. Appl. No. 11/457,064, filed Jul. 12, 2006, Acharya et al.

(Continued)

*Primary Examiner*—Donald Sparks
*Assistant Examiner*—Adrian L Kennedy
(74) *Attorney, Agent, or Firm*—Fitch, Even, Tabin & Flannery (57) ABSTRACT

A computerized method of representing a dataset with a taxonomy includes obtaining a dataset comprising a plurality of records, the dataset being characterized by a vocabulary and each of the plurality of records being characterized by at least one term within the vocabulary; identifying nearest neighbors for each term within the vocabulary; imputing a degree of membership for each nearest neighbor identified for each term within the vocabulary; augmenting the obtained dataset with the imputed degree of membership; and generating a taxonomy of the augmented dataset.

18 Claims, 7 Drawing Sheets

OTHER PUBLICATIONS

U.S. Appl. No. 11/457,090, filed Jul. 12, 2005, Acharya et al.
U.S. Appl. No. 11/457,095, filed Jul. 12, 2006, Acharya et al.
U.S. Appl. No. 11/457,107, filed Jul. 12, 2006, Acharya et al.
U.S. Appl. No. 11/457,115, filed Jul. 12, 2006, Acharya et al.
USPTO, Non Final Office Action from U.S. Appl. No. 11/457,115 mailed Feb. 12, 2009.
USPTO, Non Final Office Action from U.S. Appl. No. 11/457,090 mailed Feb. 10, 2009.
USPTO, Interview Summary for U.S. Appl. No. 11/457,064 mailed May 4, 2009.
USPTO, Non Final Office Action from U.S. Appl. No. 11/457,064 mailed Feb. 2, 2009.
USPTO, Non Final Office Action from U.S. Appl. No. 11/457,095 mailed Feb. 9, 2009.
USPTO, Non Final Office Action from U.S. Appl. No. 11/457,107 mailed Feb. 9, 2009.
Conrad, Jack G. et al., "Effective Document Clustering for Large Heterogeneous Law Firm Collections", pp. 177-187, Jan. 2005.
De Queiroz, Kevin et al., "Phylogeny as a Central Principle in Taxonomy: Phylogenetic Definition of Taxon Names", pp. 1-17, Dec. 2002.
Dhar, Vassant et al., "Discovering Interesting Patterns for Investment Decision Making with GLOWER—A Genetic Learner Overlaid with Entropy Reduction", pp. 1-30, Jan. 2000.
Examiner Interview Summary from U.S. Appl. No. 11/457,064 mailed Dec. 30, 2009.
Non-Final Office Action from U.S. Appl. 11/457,064 mailed Dec. 30, 2009.
Non-Final Office Action from U.S. Appl. No. 11/457,090 mailed Dec. 22, 2009.
Milano, et al., "Using Ontologies for XML Data Cleaning", *OTM Workshops*, 2005, pp. 562-572.
Notice of Allowance from U.S. Appl. No. 11/457,107 mailed Jul. 23, 2009.
Final Office Action from U.S. Appl. No. 11/457,064 mailed Aug. 14, 2009.
Notice of Allowance for U.S. Appl. 11/457,095 mailed Aug. 13, 2009.
Examiner Interview Summary from U.S. Appl. No. 11/457,095 mailed Aug. 13, 2009.
Final Office Action for U.S. Appl. No. 11/457,090 mailed Aug. 19, 2009.
Notice of Allowance from U.S. Appl. No. 11/457,115 mailed Aug. 25, 2009.
Lee, John W. et al., "Hierarchical Clustering Based on Ordinal Consistency", *Department of Computing, Hong Kong Polytechnic University*, Hung Hom, Kowloon, Hong Kong. Received Sep. 2. 2004, accepted May 16, 2005. Pattern Recognition 38 (2005) 1913-1925.
Lee, John W., "Order Invariant Hierarchical Clustering", *Department of Computing, Hong Kong Polytechnic University, Department of Rehabilitation Sciences, Hong Kong Polytechnic University*, Hung Hom, Hong Kong, China, 2002 IEEE 6 pgs.
Examiner Interview Summary from U.S. Appl. No. 11/457,090 mailed Mar. 12, 2010.

\* cited by examiner

| | | |
|---|---|---|
| 402a | 8498618 | ← 404 |
| 402b | 0TopOntology-Company-BroadcastStation-TVTokyo | |
| 402c | 0TopOntology-0Region-Asia-Japan | |
| 402d | Best, Underway, Sports, GolfCategory, Golf, Art, 0SubCulture, Animation, Family, FamilyGeneration, Child, Kids, Family, FamilyGeneration, Child | |
| ... | *** | |
| 402n | Kids, Cartoon | |
| ... | *** | |
| ... | *** | |
| ... | *** | |
| ... | 20040410 | |
| ... | 0930 | |
| ... | 1000 | |
| 402x | 30 | |

AUGMENTED DATASET REPRESENTATION USING A TAXONOMY WHICH ACCOUNTS FOR SIMILARITY AND DISSIMILARITY BETWEEN EACH RECORD IN THE DATASET AND A USER'S SIMILARITY-BIASED INTUITION

This application is a continuation-in-part of U.S. application Ser. No. 11/436,142, filed May 16, 2006, entitled "CLUSTERING AND CLASSIFICATION OF CATEGORY DATA" to Acharya et al., which is incorporated in its entirety herein by reference.

BACKGROUND

1. Field of Invention

Embodiments of the present invention relate generally to methods and systems adapted to cluster categorical data. More specifically, embodiments of the present invention relate to methods and systems adapted to augment a categorical dataset by imputation.

2. Discussion of the Related Art

Data is often organized in a clustering process by separating an arbitrary dataset into a plurality of subsets (i.e., clusters) according to some inherent similarity measure between data within the dataset, wherein data within a particular cluster is characterized by some common trait or attribute. Subsequently, category labels are generated using the clusters and a classifier for the dataset is constructed using the category labels. Clustering processes can be characterized according to the manner in which they form clusters. Two common clustering techniques include partitional and hierarchical techniques.

Partitional clustering techniques organize a dataset into a single collection of clusters that usually do not overlap, wherein data within each cluster is uniformly similar. Hierarchical clustering algorithms, on the other hand, create a hierarchy of clusters representing a range (e.g., from coarse to fine) of intra-cluster similarity. Hierarchical clustering algorithms are generally classified according to the manner in which they construct the cluster hierarchy. Thus, agglomerative hierarchical clustering algorithms build the cluster hierarchy from the bottom up by progressively merging smaller clusters into larger clusters while divisive hierarchical clustering algorithms build the hierarchy from the top down by progressively dividing larger clusters to form smaller clusters.

Generally, clustering algorithms work well when the dataset is numerical (i.e., when data within the dataset are all related by some inherent similarity metric or natural order). Numerical datasets often describe a single attribute or category. Categorical datasets, on the other hand, describe multiple attributes or categories that are often discrete, lacking a natural similarity measure between them. From the clustering perspective this also implies that the centroid of a cluster in a categorical dataset is an undefinable entity. Therefore, categorical data is usually not effectively clustered using partitional clustering techniques.

It has been repeatedly observed that dissimilarity or keyword-wise mismatch among records is as useful as their similarity or keyword-wise match. In information-theoretic calculations, similarity produces an "attractive force" and dissimilarity generates a "repulsive force"—both of which are equally required to generate a clustering that accurately represents the underlying pattern in the dataset. In hierarchical agglomerative clustering, when intra-cluster similarity is predominant, clusters having highest similarity are merged. This behavior is in perfect alignment with the intuition of the user. However, when intra-cluster dissimilarity is predominant, clusters having lowest dissimilarity are merged. This behavior is somewhat counter-intuitive because users tend to look for similarity and ignore dissimilarity.

The problem outlined above is especially noticeable with respect to highly sparse categorical data, where dissimilarity is predominant most of the time. For example, one type of categorical data (e.g., electronic program guide (EPG) data) contains an attribute (e.g., a descriptor field) that contains text from an unrestricted vocabulary. If text from this attribute is used in projecting the data onto a vector space, then the dimension of the vector space can quickly attain a high dimension (e.g., with O(1000) features) and sparse in that vectors within the dataset typically have more than 99% of their components equal to zero. For example, a typical EPG dataset may include 2,154 records, wherein the descriptor fields of the records collectively contain 2,694 unique terms. The average number of appearances of a term per record is 4.3. But this average is skewed upwards by a small number records (e.g., 2%) having a large number (e.g., 30 or more) of terms (i.e., nonzero features in the term vector). 56% of the records have 3 or fewer terms, resulting in a dataset having a sparsity of at least 3/2694≈99.9%. 76% of the records have 5 or fewer terms, giving a sparseness of at least 5/2694>99.8%.

Considering both similarity and dissimilarity simultaneously across records in a categorical dataset, and at the same time producing a clustering that is in alignment with a user's similarity-biased intuition have conventionally been viewed as two apparently contradictory requirements, but would be useful if incorporated within a clustering procedure. Accordingly, it would be beneficial to reduce the inherent sparsity of categorical datasets while increasing the overall quality of the categorical dataset to aid hierarchical agglomerative clustering processes in creating high-quality, clustering solutions that are in alignment with a user's similarity biased intuition.

SUMMARY

Several embodiments disclosed herein advantageously address the needs above as well as other needs by providing a system and method for augmenting a categorical dataset by imputation.

One embodiment describes a computerized method of representing a dataset with a taxonomy. First, a dataset comprising a plurality of records is obtained. The dataset is characterized by a vocabulary and each of the plurality of records being characterized by at least one term within the vocabulary. Next, nearest neighbors for each term within the vocabulary are identified. Subsequently, a degree of membership for each nearest neighbor identified is imputed for each term within the vocabulary. Next, the obtained dataset is augmented with the imputed degree of membership. A taxonomy of the augmented dataset is then generated.

Another embodiment describes a computer program product including a computer usable medium having computer readable code embodied therein for causing a computer to effect obtaining a dataset comprising a plurality of records, wherein the dataset is characterized by a vocabulary and each of the plurality of records is characterized by at least one term within the vocabulary. The computer readable code is also adapted to cause the computer to identify nearest neighbors for each term within the vocabulary. The computer readable code is also adapted to cause the computer to impute a degree of membership for each nearest neighbor identified for each term within the vocabulary. Further, the computer readable code is adapted to cause the computer to augment the obtained dataset with the imputed degree of membership. Finally, the computer readable code is adapted to cause the computer to generate a taxonomy of the augmented dataset.

By implementing the embodiments exemplarily described above, the similarity between records is increased by reducing the sparsity of the dataset while keeping the dimension of the vocabulary fixed. The resulting augmented dataset will, therefore, be more informative and generate a taxonomy that satisfies a user's similarity-biased intuition while taking into account both similarity and dissimilarity factors.

BRIEF DESCRIPTION OF THE DRAWINGS

The above and other aspects, features and advantages of several embodiments exemplarily described herein will be more apparent from the following more particular description thereof, presented in conjunction with the following drawings.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. It is to be understood that other embodiments may be utilized and that logical, mechanical, electrical and other changes may be made without departing from the spirit or scope of the numerous disclosed embodiments of the present invention. The scope of the numerous disclosed embodiments of the present invention should be determined with reference to the claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. All of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It will be appreciated that more or fewer processes may be incorporated into the methods illustrated in the flow diagrams discussed below without departing from the scope of the numerous disclosed embodiments of the present invention. Describing the methods by reference to a flow diagram enables one skilled in the art to develop such programs including such instructions to carry out the methods on suitably configured hardware platforms and operating environments. The computer-executable instructions may be written in a computer programming language or may be embodied in firmware logic. If written in a programming language conforming to a recognized standard, such instructions can be executed on a variety of hardware platforms and operating environments and for interface to a variety of operating systems. In addition, embodiments of the present invention are not described with reference to any particular programming language. It will be appreciated that a variety of programming languages may be used to implement the teachings of the disclosed embodiments.

Figure 1:
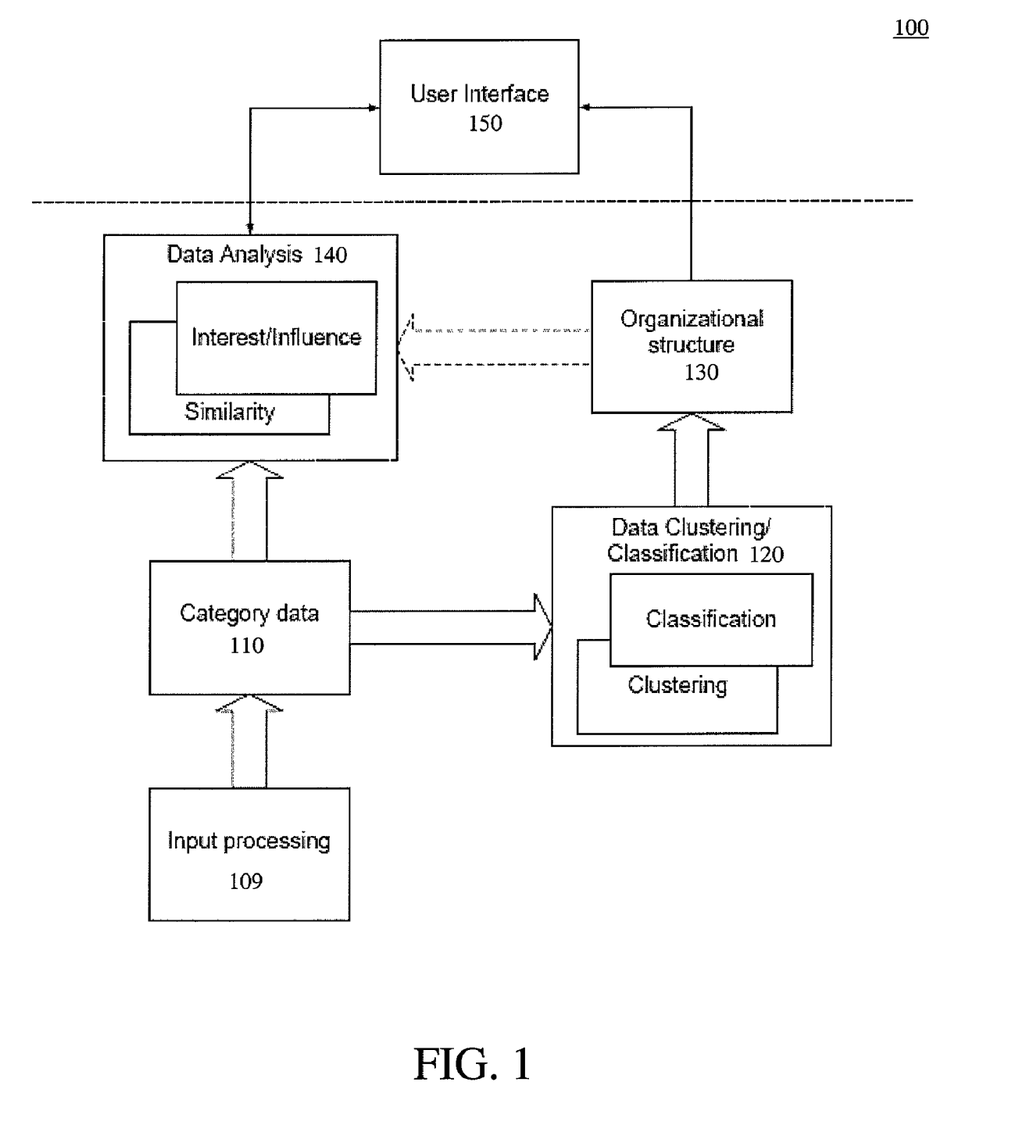
FIG. 1 illustrates a diagram of a system for assisting a user in searching and automatically organizing information.

FIG. 1 illustrates a diagram of a system 100 for assisting a user in searching and automatically organizing information, such as content, which can be characterized by categorical data 110. Such content may be, for example, recorded TV programs, electronic program guide (EPG) entries, and multimedia content. The system 100 may further assist the user in tracking preferences of the user, and may also provide recommendations to the user. The system 100 can further be used by the user to search by example and/or by query.

As shown in FIG. 1, the system 100 includes an input processing module 109, a clustering/classification module 120, a data analysis module 140, and a user interface 150. Also shown in FIG. 1 are categorical data 110 and an organizational structure 130.

Categorical data describes multiple attributes or categories. Often the categories are discrete and lack a natural similarity measure between them. The system 100 includes an input processing module 109 to pre-process input data into categorical data and load the categorical data 110.

The categorical data 110 is grouped into clusters, and/or classified into folders by the clustering/classification module 120. The category and classification methods described herein can operate on any arbitrary categorical dataset. In one embodiment, the clustering/classification module 120 may augment the categorical data for example, by imputing attributes of the categorical data. The augmentation may reduce any scarceness of categorical data while increasing the overall quality of the categorical data to aid the clustering and classification processes. Augmenting by imputation, as described herein, allows the similarity between records characterizing the categorical data to be increased by reducing the sparsity of the dataset while keeping the dimension of the vocabulary fixed. The resulting augmented dataset will, therefore, be more informative and generate a taxonomy that satisfies a user's similarity-biased intuition while taking into account both similarity and dissimilarity factors.

Generally, clustering of categorical data 110 is the process of identifying a set of underlying patterns in categorical data points within a data set and grouping the data points into one or more groups or clusters based on some measure of similarity.

The knowledge of category distribution obtained in the process of clustering is used to construct a classifier for some data spaces. Classification is the task of assigning data points to one or more of the identified categories based on some predefined proximity or divergence measure.

In one embodiment, the clustering/classification module 120 uses a folder-based classification system. The folder-based classification system allows a user to build a classifier by creating a group of folders. Each folder within the group is instantiated by a number of exemplary categorical data records.

In one embodiment, one or more of the exemplary records may be input by the user. Accordingly, a group of folders created by the user may act as a classifier such that new categorical data records are compared against the user-created group of folders and automatically sorted into the most appropriate folder. The folder-based classifier automatically creates a collection of folders, and automatically adds and deletes folders to or from the collection. The folder-based classifier may also automatically modify the contents of other folders not in the collection.

The output of the clustering/classification module 120 is an organizational data structure 130, such as a dendrogram, a cluster tree, or a matrix, collectively referred to herein as a taxonomy. A cluster tree may be used as an indexed organization of the categorical data or to select a suitable cluster of the data.

Many clustering applications require identification of a specific layer within a cluster tree that best describes the underlying distribution of patterns within the categorical data. In one embodiment, an output of the clustering/classification module 120 includes an optimal layer that contains a unique cluster group containing an optimal number of clusters.

A data analysis module 140 may use the folder-based classifiers and/or classifiers generated by clustering operations for automatic recommendation or selection of content. The data analysis module 140 may automatically recommend or provide content that may be of interest to a user or may be similar or related to content selected by a user. In one embodiment, the data analysis module 140 assigns categorical data records for new content items with the appropriate folders based on similarity.

A user interface 150 also shown in FIG. 1 is designed to assist the user in searching and automatically organizing content using the system 100.

Although shown in FIG. 1 as specific separate modules, the clustering/classification module 120, organizational data structure 130, and the data analysis module 140 may be implemented as different separate modules or may be combined into one or more modules.

Figure 2:
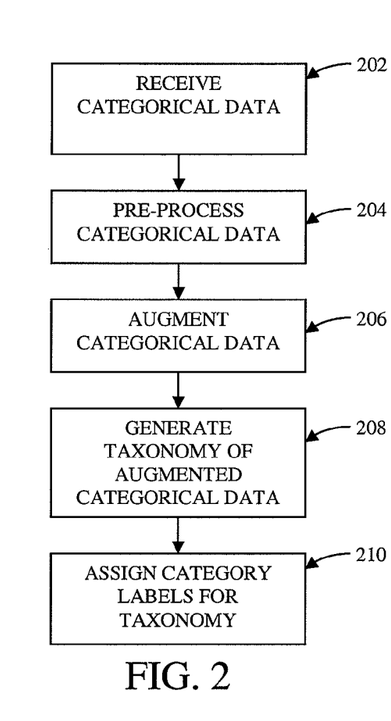
FIG. 2 illustrates an exemplary process of augmenting a dataset and generating a taxonomy from the augmented categorical dataset in accordance with embodiments of the present invention.

FIG. 2 illustrates an exemplary process of augmenting a categorical dataset and generating a taxonomy from the augmented categorical dataset in accordance with embodiments of the present invention.

Referring to FIG. 2, an exemplary process flow of augmenting a categorical dataset and generating a taxonomy from the augmented categorical dataset proceeds as follows: receive input data (202), pre-process the received input data into the aforementioned categorical data (204), and augment the categorical data (206). Subsequently, a taxonomy of the augmented categorical data can be generated (208) and category labels for the generated taxonomy can be assigned (210).

In one embodiment, the input data received at 202 includes a plurality of records electronically input into the system 100. As used herein, a record can be a document, a video, photograph, music, or the like, or any combination thereof.

An exemplary process flow of pre-processing the dataset at 204 is discussed below with respect to FIG. 3.

Figure 3:
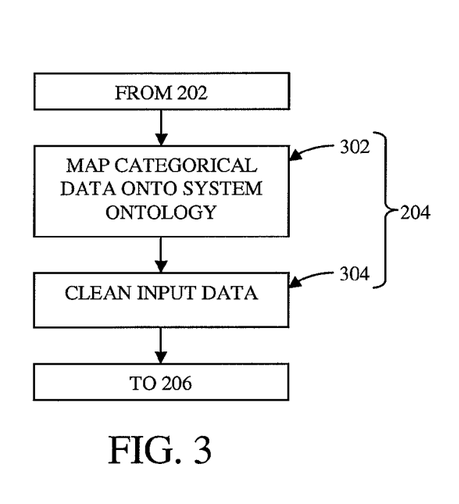
FIG. 3 illustrates an exemplary pre-processing method as applied to categorical data in accordance with embodiments of the present invention.

Referring to FIG. 3, each record is mapped onto a system ontology (302) and the dataset formed from the received records is "cleaned" (304).

In one embodiment, records within the received dataset can be mapped onto predetermined fields of a system ontology at 302. The format of the data, the transformations expected, and the format of the output data are specified in a language designed to describe metadata such as RDF. RDF employs a graph-based data model with a well-defined entailment relation. RDF is expressed in an XML format, the syntax of which explicitly specifies the parameters required and simplifies specification of the transformation process.

Figure 4:
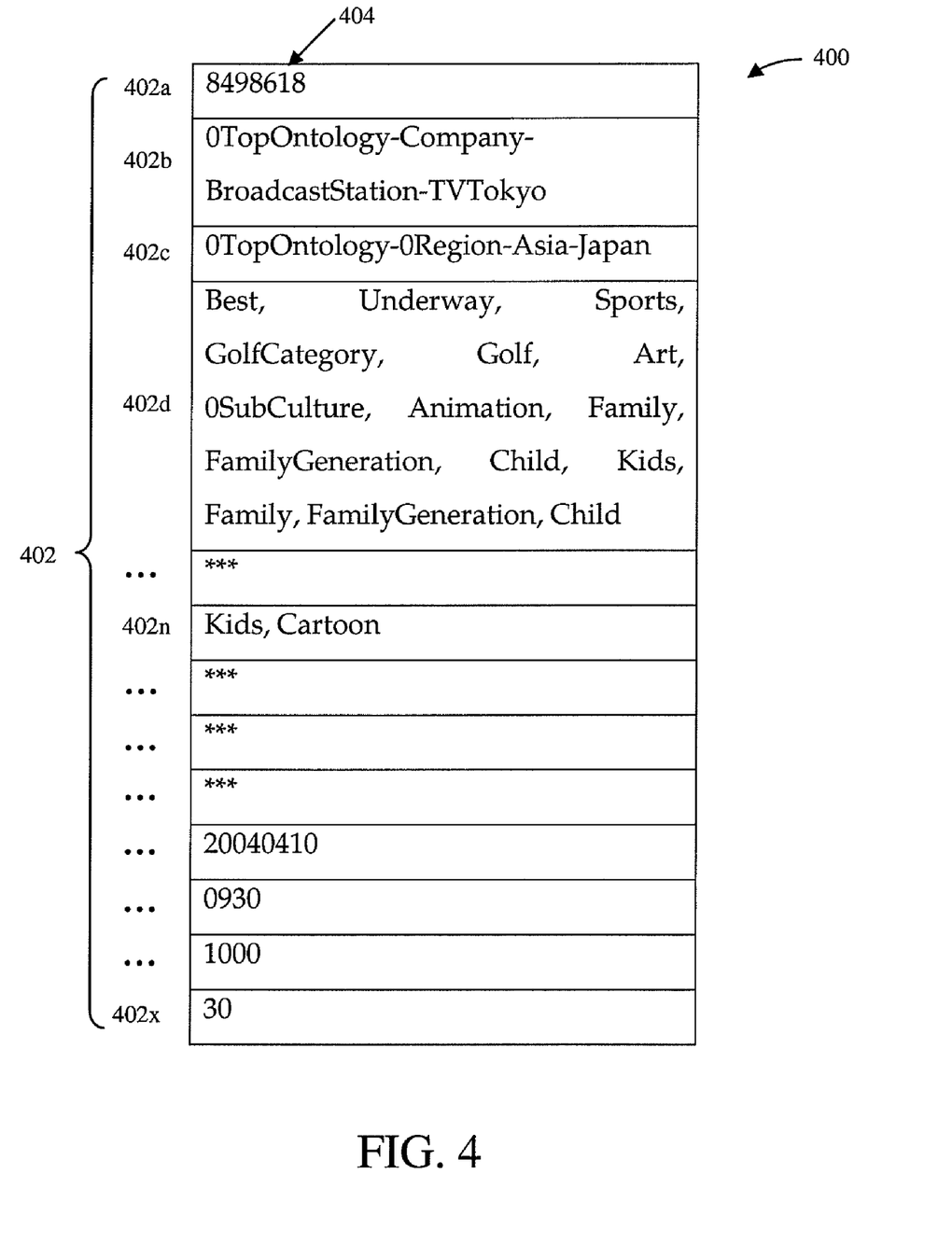
FIG. 4 illustrates an exemplary ontology onto which records containing categorical data are mapped in accordance with embodiments of the present invention.

FIG. 4 illustrates an exemplary ontology onto which records containing categorical data are mapped in accordance with embodiments of the present invention.

As shown in FIG. 4, the ontology 400 is characterized by a plurality of attributes 402 (i.e., 402a to 402x), wherein each attribute is further characterized by one or more terms 404. In one embodiment, the predetermined ontology adds abstract terms to particular attributes of a record to facilitate processing of the electronic record by the system 100. The ontology thus provides a means for uniformly representing records in a manner that the system 100 can recognize efficiently.

As shown in FIG. 4, a received record can be a document describing a particular television program. Data mapped into a first attribute 402a (i.e., an "identification attribute") corresponds to record identifier (e.g., a particular television program) and is characterized by the term "8498618"; data mapped into another attribute 402d (i.e., a "descriptor attribute") corresponds to keywords for the television program identified in attribute 402a and is characterized by the terms listed from "Best" to "Child"; data mapped into attribute 402n (i.e., a "genre attribute") corresponds to the genre for the television program identified in attribute 402a and is characterized by the terms "Kids" and "Cartoon"; data mapped into other attributes correspond to the date, start time, end time, duration, of the television program identified in attribute 402a and are characterized by the terms "20040410", "0930", "1000", and "30", respectively. In one embodiment, the term "***" represents missing data. In another embodiment, the same term can appear multiple times within the same attribute (e.g., the keyword attribute 402d contains multiple instances of the term "Family". In the illustrated embodiment, terms such as "0SubCulture" are abstract terms supplemented by the ontology.

Records are represented within the system as multi-component vectors. The dimension of each vector corresponds to the total number of terms characterizing all attributes found in all records processed by the system (i.e., the global vocabulary of the system). Values assigned to components of a vector represent the presence of a term within a corresponding record. For example, a vector component can be binarily represented as either a 0 (indicating the absence of a term from a record) or a 1 (indicating the presence of a term in a record).

For example, suppose that the vocabulary for the entire collection of records and attributes (i.e., the global vocabulary) consists of only six terms: A, B, C, D, E, and F. Let a first record $d_1$ include the terms A, B, D, and E and a second record $d_2$ include the terms C, D, and F. Accordingly, the first record $d_1$ can be binarily represented by a six-dimensional vector $d_1=\{1, 1, 0, 1, 1, 0\}$ and the second record $d_2$ can be binarily represented by a six-dimensional vector $d_2=\{0, 0, 1, 1, 0, 1\}$, wherein values of the vector component corresponding to the terms "A" and "B" are 1 for the first record $d_1$ and 0 for the second record $d_2$ (i.e., $d_1[A]=1$, $d_1[B]=1$, $d_2[A]=0$, and $d_2[B]=0$,), the value of the vector component corresponding to the term "C" is 0 for the first record $d_1$ and 1 for the second record $d_2$ (i.e., $d_1[C]=0$, $d_2[C]=1$), and so on. As shown above, the global vocabulary consists of only six terms. In practice, however, the global vocabulary includes thousands of terms, wherein any particular record includes only a relatively small number of terms. Accordingly, only a relatively few number of vector components are assigned non-zero values. In practice, therefore, records are typically represented as highly "sparse" vectors that can be difficult to process to efficiently generate folder sets and yield inaccurate results. To increase the efficiency with which folder sets are generated, and to produce more accurate results, each record is "cleaned" at 304.

In other embodiments, vector components can be numerically represented (as opposed to binarily represented) by a value corresponding to the number of times that a term occurs in a record (i.e., the frequency of the term in the record) or by a normalized value corresponding to the number of times that a term occurs in a record in addition to the total number of terms the record contains (i.e., the normalized frequency of the term in the record). An exemplary process flow of performing the cleaning at 304 is discussed below with respect to FIG. 5.

Figure 5:
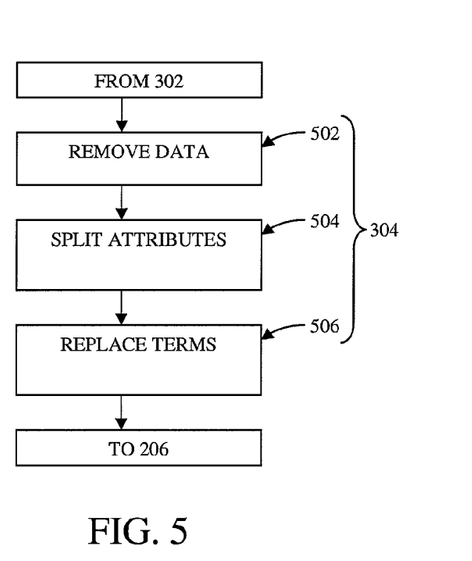
FIG. 5 illustrates an exemplary process of cleaning categorical data in accordance with embodiments of the present invention.

Referring to FIG. 5, a record can be cleaned, for example, by removing terms (502), splitting attributes (504), and replacing terms (506).

In one embodiment, terms can be removed by removing terms from attributes that are not generally useful in generating a folder set or in classifying records based on the generated folder set. Non-useful terms can be identified as those that occur infrequently (e.g., once) within a particular attribute of a record. By removing terms from each record, the total number of terms within the attribute vocabulary can be significantly reduced. For example, suppose the system receives 2154 records describing television programs playing over the course of a week. Such a collection of records may include 3016 description keywords, wherein each record contains an average of 5.37 keywords, wherein each keyword occurs an average of 4.29 times, and wherein 1113 keywords occur just once. By removing the keywords occurring just once, the size of the description keyword attribute space can be reduced by about 33%.

In one embodiment, the attributes are split by splitting large record attributes (i.e., attributes characterized by a large number of unique terms) into a plurality of smaller sub-attributes characterized by a smaller number of unique terms. By splitting a large record attribute into small sub-attributes, probabilities can be normalized over smaller, less sparse domains and yield more accurate results. Further, each sub-attribute can be weighted to reflect its relative importance within the record.

In one embodiment, a large attribute can be split into a plurality of smaller sub-attributes by grouping terms within the large attribute based on their frequency of occurrence within the large attribute. In this case, it is assumed that terms occurring more frequently are more relevant, and thus more important, than terms occurring less frequently). As a result, information indicating relevance levels of particular sub-attributes is imparted and used as a weighting value to reflect the relative importance of each sub-attribute. The size and number of the sub-attributes created as a result of the splitting can be controlled, for example, by specifying the proportions of frequencies or value of frequencies desired in each sub-attribute.

In another embodiment, a large attribute can be split into a plurality of sub-attributes by grouping semantically-related terms. In this case, meanings of words may be internally generated or obtained from a lexical reference system such as WordNet, a lexical reference system developed at the Cognitive Science Laboratory at Princeton University. As a result, information indicating a certain degree of "common-sense" is imparted and used as a weighting value to reflect the relevance of each sub-attribute. The size and number of the sub-attributes created as a result of the splitting can be controlled using statistics about particular terms and term frequencies in the attribute. In one embodiment, the total number of occurrences of terms within each sub-attribute can be maintained within a predetermined range to control the degree of relatedness between terms in a particular sub-attribute or to control the abstractness of relationships between terms within a sub-attribute.

In one embodiment, terms that can be grouped together into a sub-attribute according to their semantic interrelatedness are identified using an "is-a" (hypernym) chain relation as applied to nouns.

Consider, for example, the following hypernym chains:

1. cat, feline, carnivore, placental, mammal, vertebrate, chordate, animal, organism, living thing, object, entity 2. dog, canine, carnivore, placental, mammal, vertebrate, chordate, animal, organism, living thing, object, entity 3. umbrella, canopy, shelter, protective covering, covering, artifact, object, entity Based on the first hypernym chain, a cat is a feline, a feline is a carnivore, etc. Based on the second hypernym chain, a dog is a canine, a canine is a carnivore, etc. Based on the third hypernym chain, an umbrella is a canopy, a canopy is a shelter, etc. As shown, the terms 'cat' and 'dog' share the 'carnivore' hypernym relation much earlier in the chain than they share the 'object' hypernym relation with the term 'umbrella'. Accordingly, the term 'cat' is more semantically related to the term 'dog' than it is related to the term 'umbrella'. As a result, a large attribute containing the terms 'cat,' 'dog,' and 'umbrella' will be split into a first sub-attribute containing the terms 'cat' and 'dog' and a second sub-attribute containing the term 'umbrella.' As will be appreciated, semantic relationships between terms changes as the structural taxonomy of the lexical reference system changes or as classes are inserted into or removed from a particular relation path. It will be appreciated, however, that terms other than the nouns appearing in WordNet can be grouped in a separate attribute space and downweighted if necessary.

In the example provided above, where the received records identify television programs, one large attribute may, for example, be divided into two smaller sub-attributes, wherein the first sub-attribute, related to recreation, contains the terms 'Recreation', 'Pachinko', 'Hobby', 'Fun', 'Entertainment', 'Encore', 'Swimming', 'Skating', 'Gymnastics', 'Hunting', 'Fishing', 'Tennis', 'Basketball', 'Golf', 'Soccer', 'Baseball', and 'Athletics' while the second sub-attribute, related to food, contains the terms 'Tofu', 'Food', 'Diet', 'Vitamin', 'Sushi', 'Soup', 'Pudding', 'Dessert', 'Chocolate', and 'Beverage'. In one embodiment, each of the terms identified above can be further divided into smaller sub-attributes according to a semantic relatedness between the terms.

In one embodiment, terms can be replaced by replacing specific terms with equivalent, more abstract terms. In this case, terms found, for example, in WordNet can be replaced with equivalent, more abstract terms. As a result, the number of unique terms characterizing an attribute of a record can be reduced because several specific terms can be mapped onto the same abstract term. Moreover, vector representations of records become much less sparse because each abstract term appears in more records and there are proportionately more abstract terms appearing in each record. The size and number of the sub-attributes created as a result of the term replacements can be controlled using statistics about particular terms and term frequencies in the attribute.

In the example provided above, where the received records identify television programs, the specific terms 'Brother', 'Sister', 'Grandchild', 'Baby', 'Infant', 'Son', 'Daughter', 'Husband', 'Mother', 'Parent', and 'Father' of an attribute can all be mapped onto an equivalent abstract term 'relative'. Similarly, the specific terms 'Hunting', 'Fishing', 'Gymnastics', 'Basketball', 'Tennis', 'Golf', 'Soccer', 'Football', and 'Baseball' of an attribute can all be mapped onto an equivalent abstract term 'sport'.

By cleaning each record as exemplarily described above with respect to FIG. 5, the total number of terms to be processed by the system 100 and/or the sparsity of vectors that represent records can be reduced. As a result, the efficiency with which folder sets are ultimately generated by the system 100, and the accuracy of results ultimately yielded may be increased. In one embodiment, the dataset D produced as a result of the pre-processing at 204 contains m records $d_1$, $d_2$, ..., $d_m$ and is characterized by an attribute space containing d attributes, $A_1, A_2, \ldots, A_d$. A generic attribute space $A_i$, where i=1, ..., d, can be characterized by any combination of $n_i$ unique terms contained within a vocabulary $V_i = \{v_i^1, v_i^2, \ldots, v_i^{n_i}\}$ specific to $A_i$. Accordingly, a global vocabulary V contains n unique terms characterizing the global attribute space A (i.e., a combination of all attributes within the dataset D), such that $$n = \sum_{i=1}^{d} n_i.$$

The dataset D can be represented as an m×n matrix. Accordingly, each row of the m×n matrix corresponds to a vector-space representation of a particular record.

Once the categorical data has been pre-processed, the dataset D can be augmented at 206. In one embodiment, the dataset D can be augmented according to an imputation process exemplarily described below with respect to FIG. 6.

Figure 6:
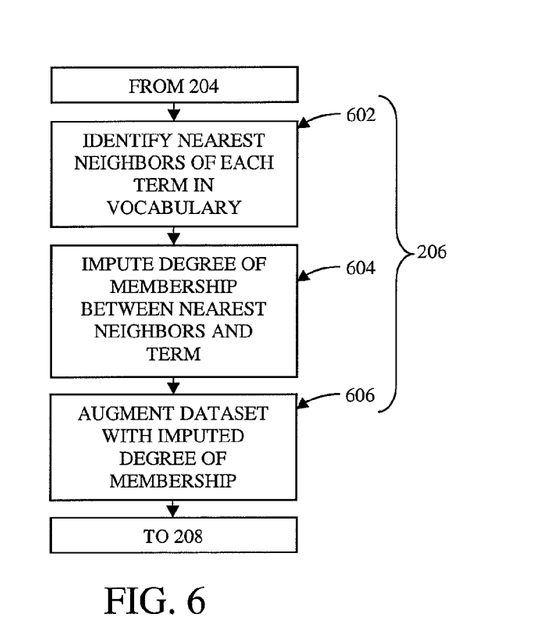
FIG. 6 illustrates an exemplary process of augmenting a dataset with imputed information in accordance with embodiments of the present invention.

Referring to FIG. 6, an exemplary imputation process flow proceeds as follows: identify k nearest neighbors u for each term v in the global vocabulary V (602), impute the degree of membership d(u|v) that each nearest neighbor has with respect to each term v (604), and augment the dataset D with values representing the imputed degree of membership d(u|v) that each nearest neighbor has with respect to each term v (606).

In one embodiment, k (where $0 \leq k \leq K$) nearest neighbors, u, for each term v in the global vocabulary V are identified at 602. Accordingly, the nearest neighbors u identified for each particular term v define a neighborhood N(v) of k nearest neighbors u. As described above, k=0 when a term v is completely semantically isolated from other terms within the global vocabulary V and k=K when a term v has a high semantic association with other terms within the global vocabulary V. The k nearest neighbors u for each term v can be identified by any suitable method. In one embodiment, the k nearest neighbors u for each term v can be identified by determining whether a term that is a potential nearest neighbor has at least a predetermined similarity with the term v.

In one embodiment, the degree of member ship d(u|v) (where $0 \leq d \leq 1$) imputed to each nearest neighbor u with respect to a term v at 604 represents the semantic association that the nearest neighbor u (also a term v∈V) has with the term v. Accordingly, the value of d(u|v)=1 when the nearest neighbor u has a high semantic association with the term v and the value of d(u|v)=0 when the nearest neighbor u has a low semantic association with the term v. The degree of membership d(u|v) can be imputed by any suitable method. For example, degree of membership for a nearest neighbor can be computed by determining the relative similarity of the nearest neighbor u across the entire neighborhood N(v). In one embodiment, the relative similarity of the nearest neighbor u can be obtained by 1) summing the absolute similarity between the nearest neighbor u and each term within the neighborhood N(v); and 2) dividing the absolute similarity between the nearest neighbor u and the term v buy the summation value.

In one embodiment, the vocabulary is augmented with the imputed degree of membership d(u|v) at 606, by adding the value of d(u|v) for each nearest neighbor u to the value of that term as represented within the dataset D. An exemplary process of augmenting the dataset D will now be discussed below with respect to FIG. 7.

Figure 7:
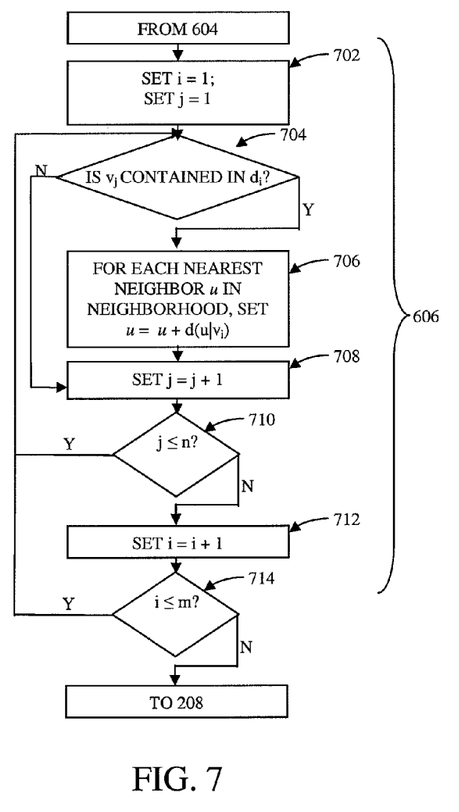
FIG. 7 illustrates an exemplary process of identifying nearest neighbors of each term in a vocabulary.

Referring to FIG. 7, the dataset D can be augmented with the imputed degree of membership d(u|v) by, for example, setting record and term counter variables, i and j, respectively, equal to 1 (702) and determining whether term $v_j$ is contained within record $d_i$ (704). In one embodiment, 704 can be accomplished by determining whether the term frequency for $v_j$ in $d_i$ is greater than zero.

If, as a result of 704, it is determined that term $v_j$ is greater than zero for $d_i$, then the value of the vector component corresponding to each nearest neighbor u in the neighborhood N(v) is increased by an amount equal to the degree of membership d(u|v) of each nearest neighbor u (706). Subsequently, or if as a result of 704, it is determined that term $v_j$ not greater than zero for $d_i$, the term counter variable j is incremented by one (708) and at 710, it is determined whether the incremented term counter variable j exceeds the total number of terms in the global vocabulary V.

If, as a result of 710, it is determined that the incremented term counter variable j does not exceed the total number of terms in the global vocabulary V, then the process flow is directed back to 704. If, as a result of 710, it is determined that the incremented term counter variable j exceeds the total number of terms in the global vocabulary V, then the process flow continues to 712 where the record counter variable i is incremented by one. At 714, it is determined whether the incremented record counter variable i exceeds the total number of records in the dataset D. If, as a result of 714, it is determined that the incremented record counter variable i does not exceed the total number of records in the dataset D, then the process flow is directed back to 704. Otherwise, the process flow continues to 208 and a taxonomy is generated.

In one embodiment, the taxonomy, $\Gamma$, generated at 208 is a taxonomy of the augmented dataset D resulting from 206. A given layer $\Gamma_t$ within the taxonomy $\Gamma$ contains a set of k(t) clusters nested within a hierarchically higher layer $\Gamma_{t+1}$, containing a set of k(t+1) clusters (k(t+1)<k(t)), such that $\Gamma_t \subset \Gamma_{t+1}$. Thus, each cluster in $\Gamma_t$ is a subset of a cluster in $\Gamma_{t+1}$ and at least one cluster in $\Gamma_t$ is a proper subset of a cluster in $\Gamma_{t+1}$. In one embodiment, the taxonomy $\Gamma$ comprises h nested layers $\Gamma_1 \subset \Gamma_2 \subset \ldots \subset \Gamma_h$. The uppermost layer $\Gamma_h$ of the taxonomy contains one cluster containing all of the m records and, therefore, corresponds to the size of the dataset D. The bottommost layer of the taxonomy, $\Gamma_1$, contains m singleton leaf clusters, each corresponding to one of the m records within the dataset D. An exemplary process flow of a taxonomy generation process is discussed below with respect to FIG. 8.

Figure 8:
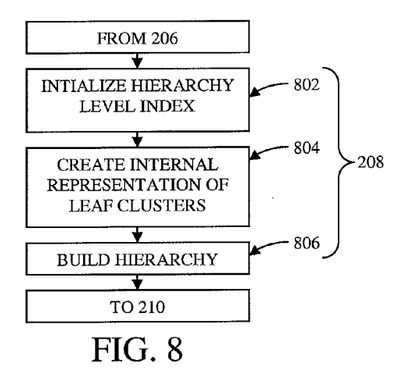
FIG. 8 illustrates an exemplary process of generating a taxonomy in connection with the process shown in FIG. 2.

Referring to FIG. 8, a taxonomy can be generated, for example, by initializing a hierarchy index of the taxonomy (802), creating an internal representation of leaf clusters (804), and building a hierarchy of cluster sets from the leaf clusters (606).

Figure 9:
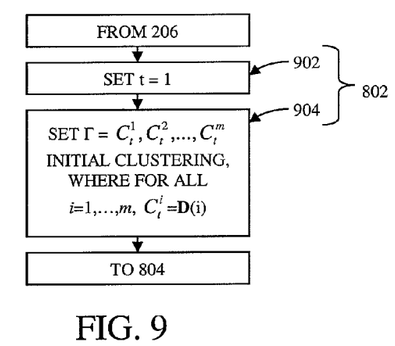
FIG. 9 illustrates an exemplary process of initializing a hierarchy level index in connection with the process shown in FIG. 8.

In one embodiment, the hierarchy index identifies layers within the taxonomy and, as shown above, is represented by the hierarchy index variable, t. Referring to FIG. 9, the hierarchy index can be initialized by setting the hierarchy index variable, t, equal to 1 (902) and setting each record within the dataset as a leaf cluster (904). As discussed above, each record $d_i \in D$ is represented as a vector. Accordingly, the bottommost layer of the taxonomy, $\Gamma_1$, contains a set of m clusters $C_1^1, C_1^2, \ldots, C_1^m$, each of which are also represented by the underlying vector of the corresponding record (i.e., $C_1^i = d_i$ for all i=1, ..., m). For the sake of ease of exposition, no formal distinction will be drawn between a leaf cluster and the underlying vector identifying the leaf cluster.

After initializing the hierarchy index at 702, an internal representation of the leaf clusters is created at 704.

In one embodiment, a generic cluster $C_t^i \in \Gamma_t$, can be internally represented by its conditional probability distribution $P(A|C_t^i)$, where $P(A=v_j|C_t^i)$ is the normalized probability of occurrence of the term $v_j$ in the cluster $C_t^i$. Similarly, a generic record $d_i \in D$ can be internally represented by its conditional probability $P(A|d_i)$, where $P(A=v_j|d_i)$ is the normalized probability of occurrence of the term $v_j$ in $d_i$. The internal representation scheme described above is herein referred to as globally normalized (i.e. g-norm) representation because the term-frequency vectors of all records and clusters are normalized across the global attribute space A to generate the probability mass function representation.

In another embodiment, each generic record $d_i \in D$ or cluster $C_t^i \in \Gamma_t$ can be internally represented as a set of d probability mass functions, one for each attribute. Accordingly, the internal representation of every record $d_i \in D$ is the disjunction of d locally normalized conditional probability distributions, $\{P(A_1|d_i)\char`\^P(A_2|d_i)\char`\^ \ldots \char`\^P(A_d|d_i)\}$ and the internal representation of every cluster $C_t^i \in \Gamma_t$ is the disjunction of d locally normalized conditional probability distributions, $\{P(A_1|C_t^i)\char`\^P(A_2|C_t^i)\char`\^ \ldots \char`\^P(A_d|C_t^i)\}$. The internal representation scheme described above is herein referred to as locally normalized (i.e., l-norm) representation.

Compared to g-norm, l-norm representation provides d degrees of freedom, as there are d entropy/information components corresponding to d probability distributions. The entropy/information components can be linearly combined in any manner, and therefore any type of clustering can be obtained varying the weight distribution across attributes. Moreover, g-norm representation propagates the effect of sparsity within one attribute to all other attributes whereas l-norm representation confines attribute-local sparsities to the same local attribute space.

Figure 10:
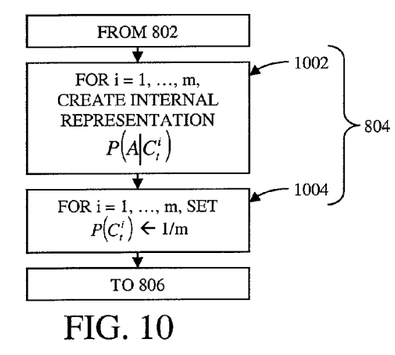
FIG. 10 illustrates an exemplary process of creating an internal representation of leaf clusters in connection with the process shown in FIG. 8.

Therefore, and as shown in FIG. 10, the internal representation of each leaf cluster $C_1^1, C_1^2, \ldots, C_1^m$ can be created by determining the conditional probability distribution $P(A|C_1^i)$ of each leaf cluster $C_1^i$ (for all i=1, ..., m) (1002), and setting the marginal probability $P(C_1^i)$ of each leaf cluster $C_1^i$ (for all i=1, ..., m) equal to 1/m (1004).

After creating the internal representation of the leaf clusters, the hierarchy can be built at 806. In one embodiment, the hierarchy is generated according to a hierarchical agglomerative clustering process. In one embodiment, the hierarchical agglomerative clustering process is a clustering process that partitions the dataset D into k mutually exclusive clusters (where k≦m), $C_1, C_2, \ldots, C_k$, such that the following conditions are satisfied:

1. For all i=1, ..., k, $C_i$ is a non-null subset;
2. For all i, j=1, ..., k, i≠j, $C_i$ and $C_j$ are non-overlapping, i.e., $C_i \cap C_j$ is null; and
3. All the clusters, when combined together, are exhaustive, i.e., $\cup_{i=1}^{k} C_i = D$.

Figure 11:
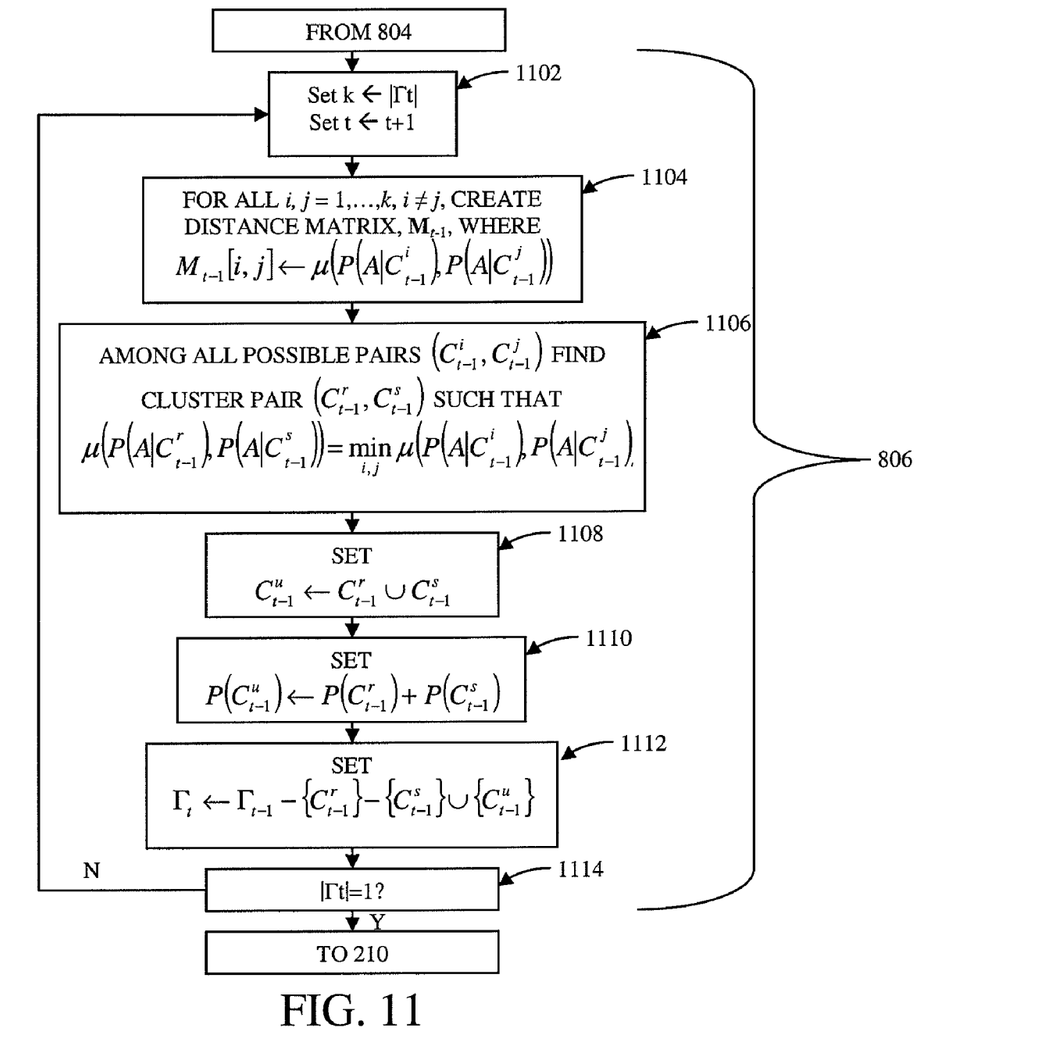
FIG. 11 illustrates an exemplary process of building a hierarchy in connection with the process shown in FIG. 8.

Referring to FIG. 11, the hierarchy can be built, for example, by successively merging cluster pairs together according to a predetermined entropic similarity condition. In one embodiment, such a hierarchy can be built, for example, by setting a cluster number variable, k, and the aforementioned taxonomy layer variable, t, (1102), creating a distance matrix $M_{t-1}$ (1104), identifying a pair of clusters listed in the distance matrix $M_{t-1}$ according to a predetermined entropic similarity condition (1106), merging the identified cluster pair (1108), setting the marginal probability of the merged cluster pair (1110), creating a new taxonomy layer containing the merged cluster pair in addition to all non-merged clusters (1112), and determining whether the new taxonomy layer contains a single cluster (1114). If it is determined that the new taxonomy layer contains a single cluster, then building of the hierarchy is complete and the process proceeds to 210. However, if it is determined that the new taxonomy layer does not contain a single cluster, then the process flow is directed back to 1102.

Upon initially setting the cluster number and taxonomy layer variables, k and t, at 1102, the value of the cluster number variable, k, is inherited from 802 and the value of the taxonomy layer variable, t, is inherited from 1002 and incremented by one. Subsequent values of the cluster number variable, k, and the taxonomy layer variable, t, are based on the number of clusters contained within each new taxonomy layer after cluster pairs have been merged and non-merged clusters have been isomorphically mapped from preceding taxonomy layers.

In one embodiment, the distance matrix $M_{t-1}$ created at 1104 is an i×j matrix (i=j=1, . . . , k) listing all possible combinations of clusters present within the taxonomy layer $\Gamma_{t-1}$. In another embodiment, each entry within the distance matrix $M_{t-1}$ identifies a degree of similarity between a cluster identified in the $i^{th}$ row and a cluster identified in the $j^{th}$ column of the distance matrix $M_{t-1}$.

Where clusters are internally represented under the l-norm representation schema, the degree of similarity can be represented by an entropic distance metric, $\mu$ that characterizes a measure of the divergence (or proximity) between every possible pair-wise combination of clusters present within the taxonomy layer $\Gamma_{t-1}$. In one embodiment, values for the entropic distance metric, $\mu$, can be obtained using principles related to information-theoretic data compression.

According to information-theoretic data compression, if the value-set of a random variable X is compressed into a smaller-sized value-set of another random variable Y, and if both X and Y contain information about a third random variable Z, then. The information content of Y is always upper-bounded by (i.e., less than or equal to) the information content of X, which means there is always some finite amount of information loss when X is compressed to Y.

Applying the aforementioned information-theoretic compression principles to the context of generating a taxonomy of categorical data, the information content of $\Gamma_{t-1}$, about the global vocabulary A, is defined as:

$$I(A,\Gamma_{t-1})=H(A)-H(A|\Gamma_{t-1}),$$

where H(A) is the absolute entropy and $H(A|\Gamma_{t-1})$ is the $\Gamma_{t-1}$-conditional entropy of A. Similarly, the information content of $\Gamma_t$, about the global vocabulary A, is $I(A,\Gamma_t)$.

During the hierarchical agglomerative clustering process, $\Gamma_t$ is created from $\Gamma_{t-1}$ and the loss of information content (i.e., information loss or differential mutual information) incurred when $\Gamma_t$ is generated from $\Gamma_{t-1}$ is defined as:

$$\delta I(\Gamma_{t-1},\Gamma_t)=I(A,\Gamma_{t-1})-I(A,\Gamma_t)=H(A|\Gamma_t)-H(A|\Gamma_{t-1}).$$

As shown above, the amount of information loss incurred when $\Gamma_t$ is generated from $\Gamma_{t-1}$ is equal to the increase in the conditional uncertainty when $\Gamma_t$ is generated from $\Gamma_{t-1}$. Accordingly, the equivalence between differential mutual information $\delta I(\Gamma_{t-1}, \Gamma_t)$ and $\mu$ is as follows:

$$\delta I(\Gamma_{t-1},\Gamma_t)=\mu(P(A|C_{t-1}^i),P(A|C_{t-1}^j))$$

In one embodiment, the differential mutual information $\delta I(\Gamma_{t-1}, \Gamma_t)$ can be determined based on the well known Jensen-Shannon (JS) divergence measure, quantifying the difference between two or more probability distributions, which are transformed representations of categorical data vectors. The JS measure is built upon the Kullback-Leibler (KL) divergence measure and, therefore, inherits all the properties of KL divergence. However, the JS measure does not suffer from the singularity problem. Moreover, the JS divergence can be generalized to more than two distributions and argument distributions can be weighted.

For any two arbitrary, mutually exclusive clusters, $C_{t-1}^i$, $C_{t-1}^j \in \Gamma_{t-1}$, with respective likelihood probabilities $\pi_i$ and $\pi_j$, let the union be $C_{t-1}^u = C_{t-1}^i \cup C_{t-1}^j$, with corresponding likelihood probability $\pi_u = \pi_i + \pi_j$. The probability mass function representation of the merged cluster $C_{t-1}^u$ over the attribute space can be defined as the weighted mean of the probability functions of $C_{t-1}^i$ and $C_{t-1}^j$:

$$P(A \mid C_{t-1}^u) = \frac{\pi_i}{\pi_u} P(A \mid C_{t-1}^i) + \frac{\pi_j}{\pi_u} P(A \mid C_{t-1}^j),$$

and the JS-divergence between $C_{t-1}^i$ and $C_{t-1}^j$, is:

$$JS(P(A \mid C_{t-1}^i) \| P(A \mid C_{t-1}^j)) =$$
$$\frac{\pi_i}{\pi_u} KL\Big(P(A \mid C_{t-1}^i)\|P(A \mid C_{t-1}^u)\Big) + \frac{\pi_j}{\pi_u} KL(P(A \mid C_{t-1}^j)\|P(A \mid C_{t-1}^u)).$$

Using this JS-divergence function, the differential mutual information between $C_{t-1}^i$ and $C_{t-1}^j$, can be represented as a linear function of their JS-divergence:

$$\mu(P(A|C_{t-1}^i),P(A|C_{t-1}^j))= (\pi_i+\pi_j)JS(P(A|C_{t-1}^i)\|P(A|C_{t-1}^j)).$$

Thus, for each i=1, . . . , m, and for each j=1, . . . , k, the entry M[i, j] created at 1104 denotes $\mu(P(A|C_{t-1}^i), P(A|C_{t-1}^j))$ (i.e., the entropic distance between the $i^{th}$ and $j^{th}$ clusters in $\Gamma_{t-1}$).

As discussed above, the l-norm representation schema transforms each record and cluster into a set of d locally normalized probability distributions, one normalized probability distribution for each of the d attributes. Therefore, the entropic proximity or divergence measure between two records or clusters is a weighted summation of the entropic similarity or dissimilarity measure between respective intra-attribute probability functions. Assuming that the weight distribution over the attributes $A_1, A_2, \ldots, A_d$ is $\{\omega_1, \omega_2, \ldots, \omega_d\}$, each individual weight can be used to regulate the contribution of an entropic proximity or divergence measure specific to a particular attribute. In one embodiment, the entropic divergence measure is obtained as follows:

$$M_{t-1}[i, j] \leftarrow \sum_{q=1}^{d} \exp(-\lambda\omega_q)\mu(P(A_q \mid C_{t-1}^i), P(A_q \mid C_{t-1}^j)),$$

and the entropic proximity measure as follows:

$$M_{t-1}[i, j] \leftarrow \sum_{q=1}^{d} \omega_q\exp(-\lambda\mu(P(A_q \mid C_{t-1}^i), P(A_q \mid C_{t-1}^j))),$$

where $\lambda$ is a gradient-controlling parameter of the entropic measure $\mu$.

In many embodiments, less weight may be given to the divergence between two probability components if the corresponding attribute is of a higher weight while more weight may be given the proximity between two probability components if the corresponding attribute is of a higher weight.

In view of the above, the predetermined entropic similarity condition, from which cluster pairs are identified at 1106, represents a minimal amount of information loss incurred as a result of generating a new taxonomy layer $\Gamma_t$ from a previous taxonomy layer $\Gamma_{t-1}$. Referring back to the principles of information-theoretic data compression, a high-quality data compression is achieved when the amount of information loss is minimized. Accordingly, and as applied to the present case of building the hierarchy, pairs of clusters listed in the distance matrix $M_{t-1}$ are identified at 1106 by identifying cluster pairs listed within the distance matrix $M_{t-1}$ which, when merged, will minimize the amount of information loss $\delta I(\Gamma_{t-1}, \Gamma_t)$ incurred when $\Gamma_t$ is generated from $\Gamma_{t-1}$. Stated another way, pairs of clusters listed in the distance matrix $M_{t-1}$ are identified at 1106 by identifying cluster pairs listed within the distance matrix $M_{t-1}$ which, when merged, will maximize the reduction of uncertainty as numerous, smaller-sized clusters are grouped into fewer, larger-sized clusters. Thus, clusters $C_{t-1}{}^i$ and $C_{t-1}{}^j$ that are identified according to the predetermined entropic similarity condition described above have a maximum amount of overlap in the information that they contain about A. Clusters $C_{t-1}{}^i$ and $C_{t-1}{}^j$ within such cluster pairs can be marked as $C_{t-1}{}^r$ and $C_{t-1}{}^s$, respectively.

In an embodiment where the entropic distance metric, $\mu$, represents a measure of proximity (i.e., closeness) between clusters $C_{t-1}{}^i$ and $C_{t-1}{}^j$ clusters $C_{t-1}{}^r$ and $C_{t-1}{}^s$ are identified for which $\mu(P(A|C_{t-1}{}^i),P(A|C_{t-1}{}^j))$ is a maximum (i.e., a maximum entropic proximity), resulting in the equivalence:

$$\min \delta I(\Gamma_{t-1}, \Gamma_t) \equiv \max_{i,j} \mu(P(A \mid C_{t-1}^i), P(A \mid C_{t-1}^j)).$$

In an embodiment where the entropic distance metric, $\mu$, represents a measure of divergence (i.e., farness) between clusters $C_{t-1}{}^i$ and $C_{t-1}{}^j$, clusters $C_{t-1}{}^r$ and $C_{t-1}{}^s$ are identified for which $\mu(P(A|C_{t-1}{}^i),P(A|C_{t-1}{}^j))$ is a minimum (i.e., a minimum entropic divergence), resulting in the equivalence:

$$\min \delta I(\Gamma_{t-1}, \Gamma_t) \equiv \min_{i,j} \mu(P(A \mid C_{t-1}^i), P(A \mid C_{t-1}^j)).$$

In one embodiment, cluster pairs can be merged together at 1108 by performing a union operation of all identified clusters $C_{t-1}{}^r$ and $C_{t-1}{}^s$ to form $C_{t-1}{}^u$ (i.e., $C_{t-1}{}^u \leftarrow C_{t-1}{}^r \cup C_{t-1}{}^s$). Accordingly, each merged cluster $C_{t-1}{}^u$ represents the union of a plurality of clusters. As mentioned above each leaf cluster $C_1{}^i$ is identified by an underlying vector. In one embodiment, $C_{t-1}{}^u$ can be identified by an underlying vector identifying the centroid of the plurality of clusters it contains. For the sake of ease of exposition, no formal distinction will be drawn between a merged cluster and the underlying vector identifying the merged cluster.

In one embodiment, the new taxonomy layer can be created at 1112 by isomorphically mapping the non-merged clusters onto the new taxonomy layer.

An exemplary method of identifying pairs of clusters listed in the distance matrix $M_{t-1}$ according to a similarity condition as discussed above with respect to 1106 to facilitate merging identified cluster pairs into a single cluster at 1108 will now be discussed in greater detail with respect to FIG. 12.

Figure 12:
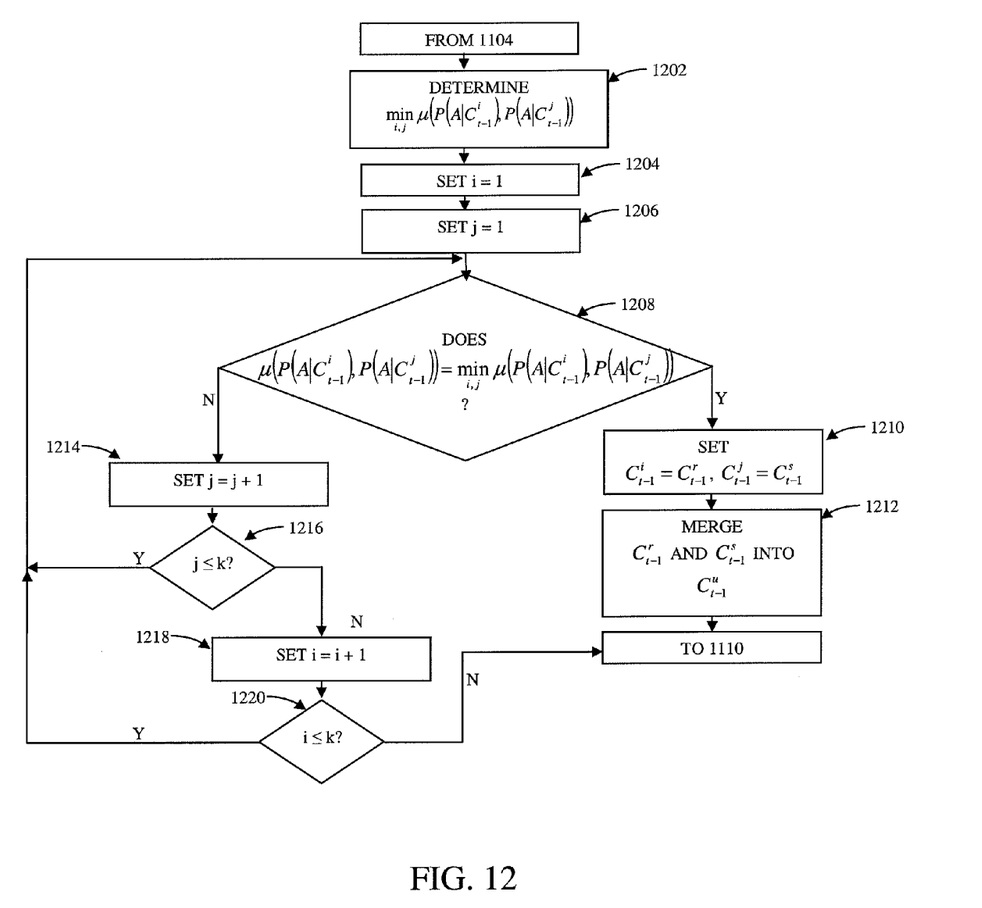
FIG. 12 illustrates an exemplary process of identifying and merging cluster pairs in accordance in connection with the process shown in FIG. 11.

Referring to FIG. 12, an exemplary identification and merging process can be accomplished by, for example, determining for all entries within the distance matrix $M_{t-1}$, $$\min_{i,j} \mu(P(A \mid C_{t-1}^i), P(A \mid C_{t-1}^j))$$

when the entropic distance metric, $\mu$, represents a measure of divergence (1202), setting a distance matrix row counter variable, i, equal to 1 (1204), setting a distance matrix column counter variable, j, equal to 1 (1206), and determining whether the $$\mu(P(A \mid C_{t-1}^i), P(A \mid C_{t-1}^j)) = \min_{i,j} \mu(P(A \mid C_{t-1}^i), P(A \mid C_{t-1}^j)). \quad (1208)$$

In embodiments where the entropic distance metric, $\mu$, represents a measure of proximity, the entropic distance metric, $\mu$, can be determined at 1202 by determining, for all entries within the distance matrix $M_{t-1}$, $$\max_{i,j} \mu(P(A \mid C_{t-1}^i), P(A \mid C_{t-1}^j)).$$

If, as a result of 1208, it is determined that $$\mu(P(A \mid C_{t-1}^i), P(A \mid C_{t-1}^j)) = \min_{i,j} \mu(P(A \mid C_{t-1}^i), P(A \mid C_{t-1}^j)),$$

then the process flow proceeds to 1210 where $C_{t-1}{}^i$ and $C_{t-1}{}^j$ are marked $C_{t-1}{}^r$ and $C_{t-1}{}^s$, respectively, and are subsequently merged into a single cluster $C_{t-1}{}^u$ at 1212. The process flow then continues to 1110 as discussed above.

If, as a result of 1208, it is determined that $$\mu(P(A \mid C_{t-1}^i), P(A \mid C_{t-1}^j)) \neq \min_{i,j} \mu(P(A \mid C_{t-1}^i), P(A \mid C_{t-1}^j)),$$

then the process flow proceeds directly to 1214 where the distance matrix column counter variable, j, is incremented by 1 and, subsequently at 1216, it is determined whether the incremented distance matrix column counter variable, j, exceeds the total number of clusters, k, within the taxonomy layer $\Gamma_{t-1}$.

If, as a result of 1216, it is determined that the incremented distance matrix column counter variable, j, is less than or equal to the total number of clusters, k, the process flow is directed back to 1208. If, as a result of 1216, it is determined that the incremented distance matrix column counter variable, j, is greater than the total number of clusters, k, the process flow continues to 1218 where the distance matrix row counter variable, i, is incremented by 1 and, subsequently at 1220, it is determined whether the incremented distance matrix column row variable, i, exceeds the total number of clusters, k, within the taxonomy layer $\Gamma_{t-1}$.

If, as a result of 1220, it is determined that the incremented distance matrix column row variable, i, is less than or equal to the total number of clusters, k, the process flow is directed back to 1208. If, as a result of 1220, it is determined that the incremented distance matrix row counter variable, i, is greater than the total number of clusters, k, the process flow continues to 1110 discussed above.

It will be appreciated that a taxonomy generating process described above with respect to FIGS. 8 to 12 is only one exemplary process and that substantially any process may be employed. It will be appreciated that the taxonomy $\Gamma$ can be generated at 208 by any suitable method. For example, the taxonomy $\Gamma$ can be generated according to a process exemplarily described in copending application Ser. No. 11/457, 064 entitled "METHOD AND SYSTEM FOR SUBSPACE BOUNDED RECURSIVE CLUSTERING OF CATEGORICAL DATA," application Ser. No. 11/475,090 entitled "METHOD AND SYSTEM FOR ORDER INVARIANT CLUSTERING OF CATEGORICAL DATA," and/or application Ser. No. 11/457,115 entitled "METHOD AND SYSTEM FOR SEED BASED CLUSTERING OF CATEGORICAL DATA," all of which are incorporated by reference as if fully set forth herein. As described above, the taxonomy generated can be a hierarchical taxonomy. It will be appreciated, however, that the taxonomy generated at 208 need not be based on a hierarchy of cluster sets as described above with respect to FIG. 8 but can, instead be based on some non-hierarchical arrangement of clusters (e.g., as generated according to a process exemplarily described in copending application Ser. No. 11/457,107 entitled "FOLDER-BASED ITERATIVE CLASSIFICATION," incorporated by reference as if fully set forth herein). Accordingly, the taxonomy generated can be a non-hierarchical taxonomy.

Referring back to FIG. 2, after the taxonomy has been generated at 206, category labels are assigned to each cluster created at 210. In one embodiment, each category label is descriptive of the contents of the cluster it is assigned to and can be assigned manually and/or automatically by the system by any known means. In another embodiment, the category label for each cluster corresponds to the centroid of that cluster.

The taxonomy that has been generated from the categorical dataset can be used in various ways. For example, the taxonomy can be used as an indexed organization of the categorical dataset or a layer within the taxonomy can be selected to characterize and classify the categorical dataset. An exemplary process of classifying records within the categorical dataset can include treating the selected taxonomy layer as a nearest neighbor classifier.

As described above, numerous embodiments of the present invention are provided to reduce the inherent sparsity of categorical datasets while increasing the overall quality of the categorical dataset to aid hierarchical agglomerative clustering processes in creating high-quality, clustering solutions that are in alignment with a user's similarity biased intuition. In one embodiment, the similarity factor between records in a dataset can be increased by reducing sparsity within the dataset. In another embodiment, dissimilarity between records is not ignored. Rather, the quality of the dissimilarity between records is identified and used to increase the similarity therebetween. According to numerous embodiments, the received categorical dataset is augmented with probabilistically imputed term values.

While the invention herein disclosed has been described by means of specific embodiments, examples and applications thereof, numerous modifications and variations could be made thereto by those skilled in the art without departing from the scope of the invention set forth in the claims.

What is claimed is:

1. A computerized method of representing a dataset with a taxonomy, comprising:
obtaining a dataset comprising a plurality of records, the dataset being characterized by a vocabulary and each record of the plurality of records being characterized by at least one term within the vocabulary, thereby providing an obtained dataset;
preprocessing the obtained dataset, wherein the preprocessing step comprises the steps of mapping each record onto a system ontology and cleaning the obtained dataset:
identifying a plurality of nearest neighbors for each term within the vocabulary;
imputing a degree of membership for each nearest neighbor of the plurality of nearest neighbors identified for each term within the vocabulary, thereby providing an imputed degree of membership;
augmenting the obtained dataset with the imputed degree of membership, thereby increasing a similarity between each record by reducing a sparsity of the obtained dataset while fixing a dimension of the vocabulary, and thereby providing an augmented dataset; and
generating a taxonomy of the augmented dataset, thereby satisfying a user's similarity-biased intuition while taking into account a plurality of factors, the plurality of factors comprising a similarity between each record and a dissimilarity between each record,
wherein the computerized method of representing a dataset with a taxonomy occurs within a physical computer.

2. The method of claim 1, wherein imputing the degree of membership for each nearest neighbor comprises quantifying a semantic association that each term in the vocabulary has with respect to a nearest neighbor identified for that term.

3. The method of claim 1, further comprising:
representing each record as a multi-component vector, wherein a value assigned to each vector component represents the presence of a term within the record, wherein augmenting the dataset comprises:
adding a value representing the degree of membership for each nearest neighbor to the value assigned to each vector component.

4. The method of claim 1, wherein generating the taxonomy of the augmented dataset comprises generating a non-hierarchical taxonomy.

5. The method of claim 1, wherein generating the taxonomy of the augmented dataset comprises generating a hierarchical taxonomy.

6. The method of claim 5, wherein generating the hierarchy comprises successively merging a pair of clusters together according to a predetermined entropic similarity condition.

7. The method of claim 6, further comprising merging a pair of clusters having a minimum entropic divergence.

8. The method of claim 6, further comprising merging a pair of clusters having a maximum entropic proximity.

9. A computer program products comprising a physical computer usable medium having computer readable code embodied therein for causing a physical computer to effect:
obtaining a dataset comprising a plurality of records, the dataset being characterized by a vocabulary and each of the plurality of records being characterized by at least one term within the vocabulary;
preprocessing the obtained dataset, wherein the preprocessing step comprises the steps of mapping each record onto a system ontology and cleaning the obtained dataset:
identifying a plurality of nearest neighbors for each term within the vocabulary;
imputing a degree of membership for each nearest neighbor of the plurality of nearest neighbors identified for each term within the vocabulary, thereby providing an imputed degree of membership;
augmenting the obtained dataset with the imputed degree of membership, thereby increasing a similarity between each record by reducing a sparsity of the obtained dataset while fixing a dimension of the vocabulary, and thereby providing an augmented dataset; and
generating a taxonomy of the augmented dataset, thereby satisfying a user's similarity-biased intuition while taking into account a plurality of factors, the plurality of factors comprising a similarity between each record and a dissimilarity between each record.

10. The computer program product of claim 9, wherein the computer usable medium has computer readable code embodied therein for causing a computer to effect imputing the degree of membership for each nearest neighbor by quantifying a semantic association that each term in the vocabulary has with respect to a nearest neighbor identified for that term.

11. The computer program product of claim 9, further comprising a computer usable medium having computer readable code embodied therein for causing a computer to effect:
representing each record as a multi-component vector, wherein a value assigned to each vector component represents the presence of a term within the record, wherein augmenting the dataset comprises:
adding a value representing the degree of membership for each nearest neighbor to the value assigned to each vector component.

12. The computer program product of claim 9, wherein the computer usable medium has computer readable code embodied therein for causing a computer to effect generating the taxonomy of the augmented dataset by generating a non-hierarchical taxonomy.

13. The computer program product of claim 9, wherein the computer usable medium has computer readable code embodied therein for causing a computer to effect generating the taxonomy of the augmented dataset by generating a hierarchical taxonomy.

14. The computer program product of claim 13, wherein the computer usable medium has computer readable code embodied therein for causing a computer to effect generating the hierarchy by successively merging a pair of clusters together according to a predetermined entropic similarity condition.

15. The computer program product of claim 14, further comprising a computer usable medium having computer readable code embodied therein for causing a computer to effect merging a pair of clusters having a minimum entropic divergence.

16. The computer program product of claim 14, further comprising a computer usable medium having computer readable code embodied therein for causing a computer to effect merging a pair of clusters having a maximum entropic proximity.

17. A computerized method of representing a dataset with a taxonomy, comprising:
obtaining a dataset comprising a plurality of records, the dataset being characterized by a vocabulary and each of the plurality of records being characterized by at least one term within the vocabulary;
preprocessing the obtained dataset, wherein the preprocessing step comprises the steps of mapping each record onto a system ontology and cleaning the obtained dataset;
identifying nearest neighbors for each term within the vocabulary;
imputing a degree of membership for each nearest neighbor identified for each term within the vocabulary, wherein the imputing step comprises quantifying a semantic association that each term in the vocabulary has with respect to a nearest neighbor identified for that term;
augmenting the obtained dataset with the imputed degree of membership, thereby increasing a similarity between each record by reducing a sparsity of the obtained dataset while fixing a dimension of the vocabulary, and thereby providing an augmented dataset, wherein the augmenting step comprises adding a value representing the degree of membership for each nearest neighbor to the value assigned to each vector component;
generating a taxonomy of the augmented dataset, wherein the generating step comprises at least one step selected from a group consisting essentially of generating a non-hierarchical taxonomy, generating a hierarchical taxonomy, and successively merging a pair of clusters together according to a predetermined entropic similarity condition, thereby satisfying a user's similarity-biased intuition while taking into account a plurality of factors, the plurality of factors comprising a similarity between each record and a dissimilarity between each record;
representing each record as a multi-component vector, wherein a value assigned to each vector component represents the presence of a term within the record; and
merging a pair of clusters having a divergence selected from a group consisting essentially of a minimum entropic divergence and a maximum entropic proximity, wherein the computerized method of representing a dataset with a taxonomy occurs within a physical computer.

18. The computer program product of claim 9, wherein the computer usable medium, having the computer readable code embodied therein, is further adapted to cause the computer to effect:
obtaining a dataset comprising a plurality of records, the dataset being characterized by a vocabulary and each of the plurality of records being characterized by at least one term within the vocabulary;
preprocessing the obtained dataset, wherein the preprocessing step comprises the steps of mapping each record onto a system ontology and cleaning the obtained dataset;
identifying nearest neighbors for each term within the vocabulary;
imputing a degree of membership for each nearest neighbor identified for each term within the vocabulary, wherein the imputing step comprises quantifying a semantic association that each term in the vocabulary has with respect to a nearest neighbor identified for that term;
augmenting the obtained dataset with the imputed degree of membership, wherein the augmenting step comprises adding a value representing the degree of membership for each nearest neighbor to the value assigned to each vector component, thereby increasing a similarity between each record by reducing a sparsity of the obtained dataset while fixing a dimension of the vocabulary, and thereby providing an augmented dataset;
generating a taxonomy of the augmented dataset, wherein the generating step comprises at least one step selected from a group consisting essentially of generating a non-hierarchical taxonomy, generating a hierarchical taxonomy, and successively merging a pair of clusters together according to a predetermined entropic similarity condition, thereby satisfying a user's similarity-biased intuition while taking into account a plurality of factors, the plurality of factors comprising a similarity between each record and a dissimilarity between each record;
representing each record as a multi-component vector, wherein a value assigned to each vector component represents the presence of a term within the record; and
merging a pair of clusters having a divergence selected from a group consisting essentially of a minimum entropic divergence and a maximum entropic proximity.

* * * * *

UNITED STATES PATENT AND TRADEMARK OFFICE
CERTIFICATE OF CORRECTION

| | |
|---|---|
| PATENT NO. | : 7,761,394 B2 |
| APPLICATION NO. | : 11/457103 |
| DATED | : July 20, 2010 |
| INVENTOR(S) | : Acharya et al. |

Page 1 of 1

It is certified that error appears in the above-identified patent and that said Letters Patent is hereby corrected as shown below:

Claim 1, column 17, line 65, delete "dataset:" and insert -- dataset; --.
Claim 9, column 18, line 50 (Approx.), delete "dataset:" and insert -- dataset; --.

Signed and Sealed this

Seventh Day of December, 2010

David J. Kappos
*Director of the United States Patent and Trademark Office*